US007949644B2

(12) United States Patent
Shanahan et al.

(10) Patent No.: US 7,949,644 B2
(45) Date of Patent: *May 24, 2011

(54) METHOD AND APPARATUS FOR CONSTRUCTING A COMPACT SIMILARITY STRUCTURE AND FOR USING THE SAME IN ANALYZING DOCUMENT RELEVANCE

(75) Inventors: James G. Shanahan, San Francisco, CA (US); Norbert Roma, Pittsburgh, PA (US); David A. Evans, Pittsburgh, PA (US)

(73) Assignee: JustSystems Evans Research, Inc., Pittsburgh, PA (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/152,522

(22) Filed: May 15, 2008

(65) Prior Publication Data

US 2008/0275870 A1 Nov. 6, 2008

Related U.S. Application Data

(62) Division of application No. 11/298,500, filed on Dec. 12, 2005, now Pat. No. 7,472,131.

(51) Int. Cl.
*G06F 7/00* (2006.01)
(52) U.S. Cl. ............................................ 707/706
(58) Field of Classification Search .......... 704/10; 715/501, 1, 229; 707/758, 722, 736, 802, 707/791, 770, 705, 706
See application file for complete search history.

(56) References Cited

U.S. PATENT DOCUMENTS

| 6,615,209 | B1 * | 9/2003 | Gomes et al. ........................ 1/1 |
| 6,633,868 | B1 | 10/2003 | Min et al. |
| 6,738,764 | B2 | 5/2004 | Mao et al. |
| 7,051,277 | B2 * | 5/2006 | Kephart et al. ................ 715/229 |
| 2002/0052730 | A1 * | 5/2002 | Nakao .............................. 704/10 |
| 2003/0233224 | A1 | 12/2003 | Marchisio et al. |
| 2004/0205448 | A1 * | 10/2004 | Grefenstette et al. ......... 715/500 |
| 2005/0060643 | A1 * | 3/2005 | Glass et al. ................ 715/501.1 |
| 2005/0108203 | A1 * | 5/2005 | Tang et al. ........................ 707/3 |
| 2005/0210043 | A1 * | 9/2005 | Manasse ....................... 707/100 |
| 2005/0234953 | A1 | 10/2005 | Zhang et al. |
| 2007/0005588 | A1 * | 1/2007 | Zhang et al. ...................... 707/5 |

OTHER PUBLICATIONS

David Carmel, et al., "Status Index Pruning for Information Retrieval Systems," Sep. 9-12, 2001, SIGIR '01, New Orleans, LA.
James, G. Shanahan, et al., "Boosting Support Vector Machines for Text Classification Through Parameter-free Threshold Relaxation," Nov. 2-8, 2003, CIKM '03, New Orleans, LA.

* cited by examiner

*Primary Examiner* — Hung T Vy
(74) *Attorney, Agent, or Firm* — Jones Day

(57) ABSTRACT

A computer-readable medium comprises data structure for providing information about levels of similarity between pairs of N documents. The data structure comprises a plurality of entries of similarity values representing levels of similarity for a plurality of pairs of the documents. Each of the similarity values represents a level of similarity of one document of a given pair relative to the other document of the given pair. The similarity value of each entry is greater than a threshold similarity value that is greater than zero. The plurality of similarity-value entries are fewer than $N^2-N$ in number if the similarity values are asymmetric with regard to document pairing, and the plurality of similarity-value entries are fewer than $$\frac{N^2 - N}{2}$$

in number if the similarity values are symmetric with regard to document pairing. A method and apparatus for generating the data structure are described.

9 Claims, 6 Drawing Sheets

100

Threshold = 0.400, default score = 0.250

| Doc Pair | Similarity Value |
|---|---|
| (1, 2) | 0.420 |
| (1, 3) | 0.510 |
| (1, 22) | 0.410 |
| ⋮ | ⋮ |
| (2, 1) | 0.460 |
| (2, 3) | 0.690 |
| (2, 45) | 0.530 |
| (2, 109) | 0.810 |
| ⋮ | ⋮ |
| (3, 1) | 0.440 |
| (3, 4) | 0.400 |
| (3, 52) | 0.660 |
| ⋮ | ⋮ |
| (N, N-1) | 0.500 |

METHOD AND APPARATUS FOR CONSTRUCTING A COMPACT SIMILARITY STRUCTURE AND FOR USING THE SAME IN ANALYZING DOCUMENT RELEVANCE

CROSS REFERENCE TO RELATED CASES

The present application is a divisional application of U.S. application Ser. No. 11/298,500 filed on Dec. 12, 2005 now U.S. Pat. No. 7,472,131, and entitled Method and Apparatus for Constructing a Compact Similarity Structure and for Using the Same in Analyzing Document Relevance.

BACKGROUND

1. Field of the Invention

The present disclosure relates to computerized analysis of documents and, in particular, to the efficient and compact construction and representation of the levels of similarity among documents from among a set of documents. The disclosure further relates to using the compact representation of similarity in training a model for analyzing document relevance.

2. Background Information

Many modern applications involving the analysis or manipulation of free-text information objects, such as documents, depend on constructing and using an abstraction of the contents of the information objects. Applications such as document classification or filtering, for example, may use a representation of the class or desired topic that is based on a set (or vector) of terms extracted from a set of documents that exemplify the class or topic. Many techniques take advantage of machine learning and statistical methods applied to the problem of learning the characteristic features of a set of examples representative of a class or topic, often referred to as a "training set," in part by constructing a data structure known in the art as a "similarity matrix" or "kernel matrix." A similarity matrix is a table of values reflecting the levels of similarity between pairs of documents for all documents in the training set.

Some advanced techniques for the creation of classifiers or filters model both the positive exemplars and the negative exemplars of a topic, using a sample of the "true" (on-topic) and "false" (not-on-topic) documents to create a training set. One technique, called "support vector machines" (SVMs), models or characterizes the margin of separation between the positive and negative examples in a training set as a function of the combinations of the term vectors of each document. The optimal margin is discovered in a series of steps, specific to each specific SVM algorithm. In order to facilitate the calculation of a margin, a similarity matrix (kernel matrix) of all the documents in the training set is constructed and used repeatedly.

A similarity matrix is conventionally created by computing all the respective pair-wise similarity values for the entire set of example documents in the training set used by a given learning algorithm. After the similarity matrix has been constructed, the entries of the matrix have to be stored in some manner for further use (on disk or in memory, especially if quick access is needed, for instance, during the learning procedure). For large sets of training examples, both the storage (e.g., the amount of random access memory necessary to hold the matrix) and the computation process (e.g., the CPU cycles) require significant resources. The minimization of such resources represents an important and challenging problem.

SUMMARY

It is an object of the invention to reduce the amount of storage needed to store information representing the level of similarity between pairs of documents in a training set of example documents compared to the amount of storage required for a conventional similarity matrix.

It is another object of the invention, considering limits on the amount of random access memory in a computer, to maximize the number of training examples that can be utilized in processes that require accessing information related to the level of similarity between pairs of documents in a training set, to thereby provide a more accurate model being learned with the training set.

It is another object of the invention to decrease the time required (by reducing the number of CPU cycles needed) for computing a data structure containing information representing the level of similarity between pairs of documents in a training set.

According to one exemplary embodiment, a method for constructing a data structure containing information about levels of similarity between pairs of documents of a set of documents is described. Similarity values for pairs of documents of the set of documents are obtained, and it is determined whether each of the similarity values is greater than or equal to a threshold similarity value. For each similarity value that is greater than the threshold similarity value, the similarity value is stored in the data structure.

According to another exemplary embodiment, a method for retrieving similarity values from a data structure for a set of documents is described. The data structure is accessed to determine whether the data structure contains an explicit entry for a similarity value for a given pair of documents, and, if the data structure contains an explicit entry of the similarity value for the given pair of documents, the similarity value is retrieved. If the data structure does not contain an explicit entry of the similarity value for the given pair of documents, a default similarity value is retrieved from the data structure or from another memory location.

According to another aspect an apparatus comprises a memory and a processing unit coupled to the memory, wherein the processing unit is configured to execute the above-noted methods. According to another aspect, a computer readable medium contains processing instructions that cause a processing unit to carry out the steps of the above-noted methods.

According to another aspect, a computer-readable medium has stored thereon a data structure for providing information about levels of similarity between pairs of documents of a set of documents, the documents being N in number. The data structure comprises a plurality of entries of similarity values representing levels of similarity for a plurality of pairs of said documents, each of said similarity values representing a level of similarity of one document of a given pair relative to the other document of the given pair. The similarity value of each entry is greater than a threshold similarity value that is greater than zero. The plurality of entries of similarity values are fewer than $N^2-N$ in number if the similarity values are asymmetric with regard to document pairing and wherein the plurality of entries of similarity values are fewer than $$\frac{N^2-N}{2}$$

in number if the similarity values are symmetric with regard to document pairing.

BRIEF DESCRIPTION OF THE FIGURES

FIG. 1 illustrates an exemplary data structure representing levels of similarity between pairs of documents in a training set of example documents.

DETAILED DESCRIPTION

Figure 2:
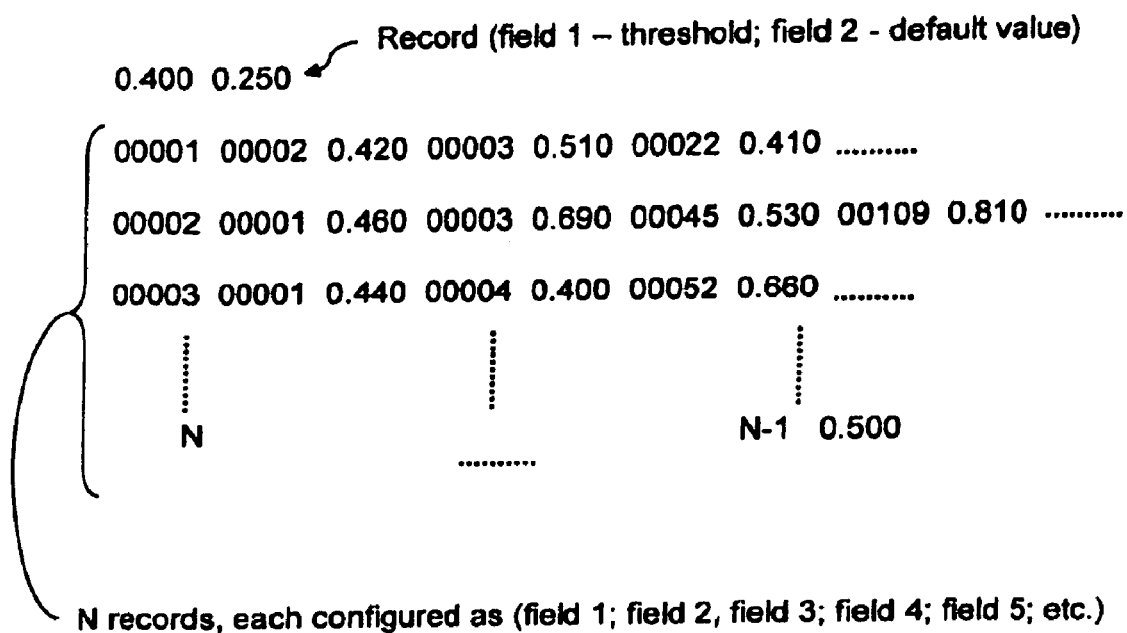
FIG. 2 illustrates another exemplary data structure representing levels of similarity between pairs of documents in a training set of example documents.

In the description that follows, documents and operations involving documents are discussed. A document as referred to herein includes text containing one or more strings of characters and/or other distinct features embodied in objects such as, but not limited to, images, graphics, hyperlinks, tables, charts, spreadsheets, or other types of visual, numeric or textual information. For example, strings of characters may form words, phrases, sentences, and paragraphs. The constructs contained in the documents are not limited to constructs or forms associated with any particular language. Exemplary features can include structural features, such as the number of fields or sections or paragraphs or tables in the document; physical features, such as the ratio of "white" to "dark" areas or the color patterns in an image of the document; annotation features, the presence or absence or the value of annotations recorded on the document in specific fields or as the result of human or machine processing; derived features, such as those resulting from transformation functions such as latent semantic analysis and combinations of other features; and many other features that may be apparent to ordinary practitioners in the art.

Also, a document for purposes of processing can be defined as a literal document (e.g., a full document) as made available to the system as a source document; sub-documents of arbitrary size; collections of sub-documents, whether derived from a single source document or many source documents, that are processed as a single entity (document); and collections or groups of documents, possibly mixed with sub-documents, that are processed as a single entity (document); and combinations of any of the above. A sub-document can be, for example, an individual paragraph, a predetermined number of lines of text, or other suitable portion of a full document. Discussions relating to sub-documents may be found, for example, in U.S. Pat. Nos. 5,907,840 and 5,999,925, the entire contents of each of which are incorporated herein by reference.

According to one aspect of the invention, a data structure stored on a computer-readable medium provides information about levels of similarity between pairs of documents of a set of documents (e.g., of a training set of documents). The data structure (also referred to herein as a "compact similarity structure" or simply "similarity structure") contains entries of similarity values representing the levels of similarity between pairs of documents of the set of documents, but does not include a separate entry for the level of similarity for each and every pair of documents of the set of documents. In contrast, a conventional similarity matrix (or kernel matrix) does include a separate entry for the level of similarity for each and every pair of documents of a training set. As such, a conventional similarity matrix can have exceedingly large storage requirements depending upon the size of the corresponding training set. The similarity structure disclosed here, on the other hand, is "compact" in the sense that it has significantly lower storage requirements compared to a conventional similarity matrix for a set of documents of a given number.

The data structure comprises a plurality of entries of numerical similarity values representing levels of similarity a plurality of pairs of documents. Each of the similarity values represents a level of similarity of one document of a given pair relative to the other document of the given pair. The numerical similarity value (e.g., a similarity score) can be determined in any suitable manner, such as disclosed elsewhere herein, but not limited thereto. The numerical similarity value of each entry is greater than a threshold similarity value that is greater than zero. The set of documents is assumed to contain N documents. In addition, the plurality of entries of similarity values are fewer than $N^2-N$ in number if the numerical similarity values are asymmetric with regard to document pairing (i.e., the similarity value of a document "j" relative to a document "i" can be different than the similarity value of document "i" relative to document "j"), and are fewer than $$\frac{N^2 - N}{2}$$

in number if the numerical similarity values are symmetric with regard to document pairing (i.e., the similarity value of a document "j" relative to a document "i" is the same as the similarity value of document "i" relative to document "j"). In contrast, a conventional asymmetric similarity matrix requires storing $N^2-N$ entries not including the diagonal entries, and a conventional symmetric similarity matrix requires storing $$\frac{N^2 - N}{2}$$

entries not including the diagonal entries.

A compact similarity structure according to the invention can be implemented in any suitable way. One example of a compact similarity structure according to the present invention is illustrated in FIG. 1. FIG. 1 shows a table 100 of hypothetical similarity scores for various pairs of documents of a hypothetical set of N documents (e.g., a training set of N documents). The assembly and use of a document set for training a document-analysis model will be described later herein. In any event, a typical size for a training set of documents may be 10,000 documents, for example. Considering that $N^2$ for such a document set is $10^8$, it will be apparent that a conventional similarity matrix for such a document set can be exceedingly large. In the example of FIG. 1, pairs of documents are indexed in the first column according to document-pair numbers, e.g., (1, 2), (1, 3), (1, 22), etc. The second column contains an associated similarity value (e.g., similarity score) for a given pair of documents, where the similarity value of a pair (x, y) represents the similarity value of document y relative to document x. In the example of FIG. 1, the numerical similarity value of each entry is greater than a threshold similarity value of 0.400.

Optionally, the similarity structure can also include an entry comprising the threshold similarity value and an entry comprising a default similarity value. In the example of FIG. 1, a threshold value of 0.400 and a default similarity value of 0.250 are stored in the similarity structure. The default similarity value is a value to be used as the similarity value for pairs of documents without explicit, individual entries in the table 100. In the example of FIG. 1, only some of the entries are shown, and the dotted lines indicate that additional entries exist in the table. As a general matter, the default similarity value can be equal to or within a predetermined percentage of the threshold similarity value (e.g., the default similarity value can be 50%, 80%, 90%, 100%, 110% of the threshold similarity value). It is convenient to use the threshold similarity value as the default similarity value.

As noted above, a similarity structure according to the present invention does not include a separate entry for the level of similarity for each and every pair of documents of the set of documents. In particular, there are no separate similarity value entries for document pairs whose similarity values are less than a threshold score. For example, in the exemplary table 100 of FIG. 1, there are no entries for document pairs (1, 4), (1, 5), (1, 6), ..., (1, 21) because it is assumed in this example that the similarity values for those pairs of documents have values less than the threshold value of 0.400. For the same reason, there are no entries in the table for document pairs (2, 4), (2, 5), (2, 6), ..., (2, 44), nor for document pair (3, 2), nor for document pairs (3, 5), (3, 6), (3, 7), ..., (3, 51). In addition, there are no entries for document pairs (1, 1), (2, 2), (3, 3), etc., because it is not necessary to provide entries for documents scored relative to themselves.

In the example of FIG. 1, it will be observed that the similarity value for document 2 relative to document 1 (1, 2) is different from the similarity value for document 1 relative to document 2 (2, 1). This example illustrates that a similarity structure according to the invention can be asymmetric. An asymmetric similarity structure can result where subsets of terms and/or features of given documents are used as a basis for computing the similarity scores of other documents relative to the given documents. Of course, a similarity structure according to the invention can be symmetric instead of asymmetric (e.g., the similarity score for (1, 2) could hypothetically be the same the as the similarity score for (2, 1) depending upon how the similarity scores are computed).

Another example of a compact similarity structure according to the present invention is illustrated in FIG. 2. FIG. 2 shows an exemplary data structure 200 based upon the same data reflected in FIG. 1. In the example of FIG. 2, the data structure 200 comprises N records corresponding to the N documents of the training set. The data structure 200 can optionally include another record comprising a field with the threshold value (e.g., 0.400) and a field with default similarity score (e.g., 0.250). Each of the N records corresponding to the N documents contains a plurality of fields. The first field contains a document number as an index. The second field contains the document number of a document whose similarity value relative to the index document is above the threshold value, and the third field contains the similarity value of that document relative to the index document. The fourth field contains the document number of another document whose similarity value relative to the index document is above the threshold value, and the fifth field contains the similarity value of that document relative to the index document, and so on. The fields within a given record can be organized in increasing order according to document number from left to right as shown in FIG. 2, but this is not necessary.

As will be discussed further below, a similarity structure according to the invention can be utilized by conducting a look-up operation to check whether the similarity structure contains an entry for particular document pair. If so, the similarity value for that document pair is retrieved from the similarity structure. If not, the default similarity value is retrieved from the similarity structure or from another memory location for the document pair in question. For example, with regard to the exemplary table 100 shown in FIG. 1, if the similarity value for document pair (3, 52) is required, a look-up operation is conducted using the table 100, an entry for (3, 52) is found, and the similarity value of 0.660 is retrieved. On the other hand, if the similarity value for document pair (3, 18) is required, a look-up operation is conducted, an entry for (3, 18) is not found, and the default similarity value of 0.250 is retrieved. Similarly, with regard to the example of FIG. 2, if the similarity value for document pair (3, 52) is required, the record indexed by 00003 is identified based on the first document of the pair in question (i.e., document 3). The pertinent fields (e.g., odd numbered fields in this example) of that record are then examined to see if an entry is present for document 52 (i.e., 00052). An entry for 00052 is found, and the similarity value recorded in the adjacent field to the right (e.g., 0.660) is retrieved. On the other hand, if the similarity value for document pair (3, 18) is required, the odd numbered fields of the record 00003 are examined, no entry for document number 18 (i.e., 00018) is found, and the default similarity value of 0.250 is retrieved.

Figure 3:
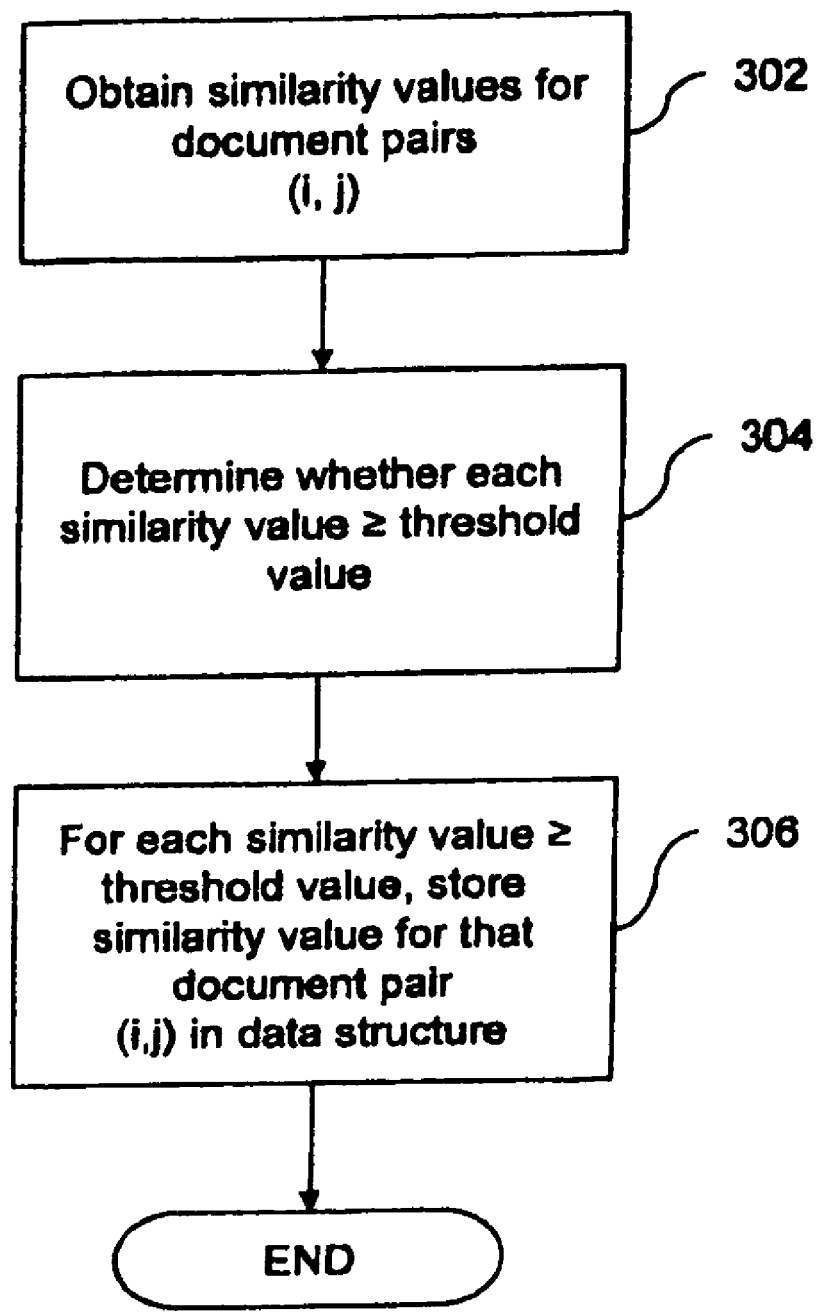
FIG. 3 is a flow diagram illustrating an exemplary method for constructing a compact similarity structure according to one aspect of the invention.

FIG. 3 illustrates an exemplary method 300 for constructing a compact similarity structure according to the invention. The exemplary method 300, and other exemplary methods described herein, can be implemented using any suitable computer system comprising a processing unit (which can include multiple processors) and memory, such as will be described later in connection with FIG. 6. At step 302, similarity values for document pairs (i, j) are obtained. The values can be obtained in successive iterations or can be obtained in a parallel fashion through the execution multiple processes or threads by one or more processors. The similarity values (e.g., similarity scores) can be obtained by retrieving them from a previously calculated list, or they can be calculated using any suitable approach. 2. As another example, the similarity values can be obtained by performing multiple queries on the set of documents, each query being based upon a given document of the set of documents, and by scoring documents responsive to the queries, wherein the scoring providing the similarity values. It will be appreciated that the query itself may provide the scoring. In an exemplary aspect, the queries can produce lists of documents ranked according to similarity values, in which case obtaining similarity values for pairs of documents can comprise extracting similarity values from the lists only for those document pairs whose similarity values are greater than or equal to the threshold similarity value. It will be appreciated that such an approach can provide a highly efficient way to populate the similarity structure. Also, similarity values can be normalized if desired, e.g., to the highest similarity value, and by other suitable methods that will be apparent to those of ordinary practitioners in the art.

Calculating similarity scores is well known to those of ordinary skill in the art. For example, various methods for evaluating similarity between two vectors, e.g., a probe and a document, are known to ordinary practitioners in the art, a probe being a subset of terms and/or features of a document.

In one example, described in U.S. Patent Application Publication No. 2004/0158569, a vector-space-type scoring approach may be used. In a vector-space-type scoring approach, a score is generated by comparing the similarity between a profile Q and the document D and evaluating their shared and disjoint terms over an orthogonal space of all terms. Such a profile is analogous to a probe referred to above. For example, the similarity score can be computed by the following formula (though many alternative similarity functions might also be used, which are known in the art):

$$S(Q_i, D_j) = \frac{Q_i \cdot D_j}{|Q_i| \cdot |D_j|} = \frac{\sum_{k=1}^{t}(q_{ik} \cdot d_{jk})}{\sqrt{\sum_{k=1}^{t} q_{ik}^2} \cdot \sqrt{\sum_{k=1}^{t} d_{jk}^2}}$$

where $Q_i$ refers to terms in the profile and $D_j$ refers to terms in the document. Evaluating the expression above (or like expressions known in the art) provides a numerical measure of similarity (e.g., expressed as a decimal fraction). Of course, any suitable approach other than that described above can be used to calculate similarity scores.

At step 304 it is determined whether each the similarity value (e.g., similarity score) obtained is greater than or equal to a threshold value. For each similarity value that is greater than or equal to the threshold value, the similarity value for that document pair is stored in the similarity structure (step 306). If a given similarity value is less than the threshold value, it is not stored in the similarity structure.

Determining an appropriate value for the threshold is within in the purview of one of ordinary skill in the art. For example, the threshold value can chosen to be any of a number of suitable threshold values, such as 0.3, 0.4, 0.5, 0.6, 0.7, 0.8 or 0.9, etc. Other approaches for setting an appropriate threshold will be described later herein following a discussion of training and implementing a document-classification model in connection with FIG. 5.

At step 308 it is determined whether there are any other document pairs whose similarity values have yet to be tested at step 304. If such a document pair remains, the process proceeds back to step 302 to obtain the similarity value for that document pair, and the process repeats. If no further document pairs remain whose similarity values need to be tested, the process ends. It will be appreciated that step 308 can take into account whether or not the similarity structure is symmetric or asymmetric, as discussed above. If the similarity structure is symmetric, it is not necessary to test a document pair (i, j) if the document pair (j, i) has already been tested.

At this point, the method 300 has generated a similarity structure comprising similarity values for document pairs whose similarity values are greater than or equal to the threshold similarity value. The similarity structure does not include individual entries for document pairs whose similarity values are less than the threshold value. As noted above, the similarity structure can also include entries for the threshold similarity value and the default similarity value, if desired.

According to another example, the computation of the similarity structure can be facilitated (the speed of the computation can be increased) by using previously generated (and optionally thresholded) rank-lists of training examples to fill the entries of the similarity structure. Such an example takes advantage of the fact that rank lists of similar examples can be generated efficiently when certain pre-assembled information is available ahead of time, such as a pre-assembled corpus of text documents, which offers efficiencies afforded by the presence of an inverted index of features (terms). Such pre-assembled information enables quick accumulation of examples most similar to a given one in a ranked list that can be thresholded at a desired similarity level. The similarity structure can be then computed in two steps. First, a thresholded rank list can be created for each example in the set of documents (e.g., training set). Second, each rank list can be used to populate information in the similarity structure (information corresponding to the similarity between the example used to create this particular rank list and all the other examples in the set of documents).

Figure 4:
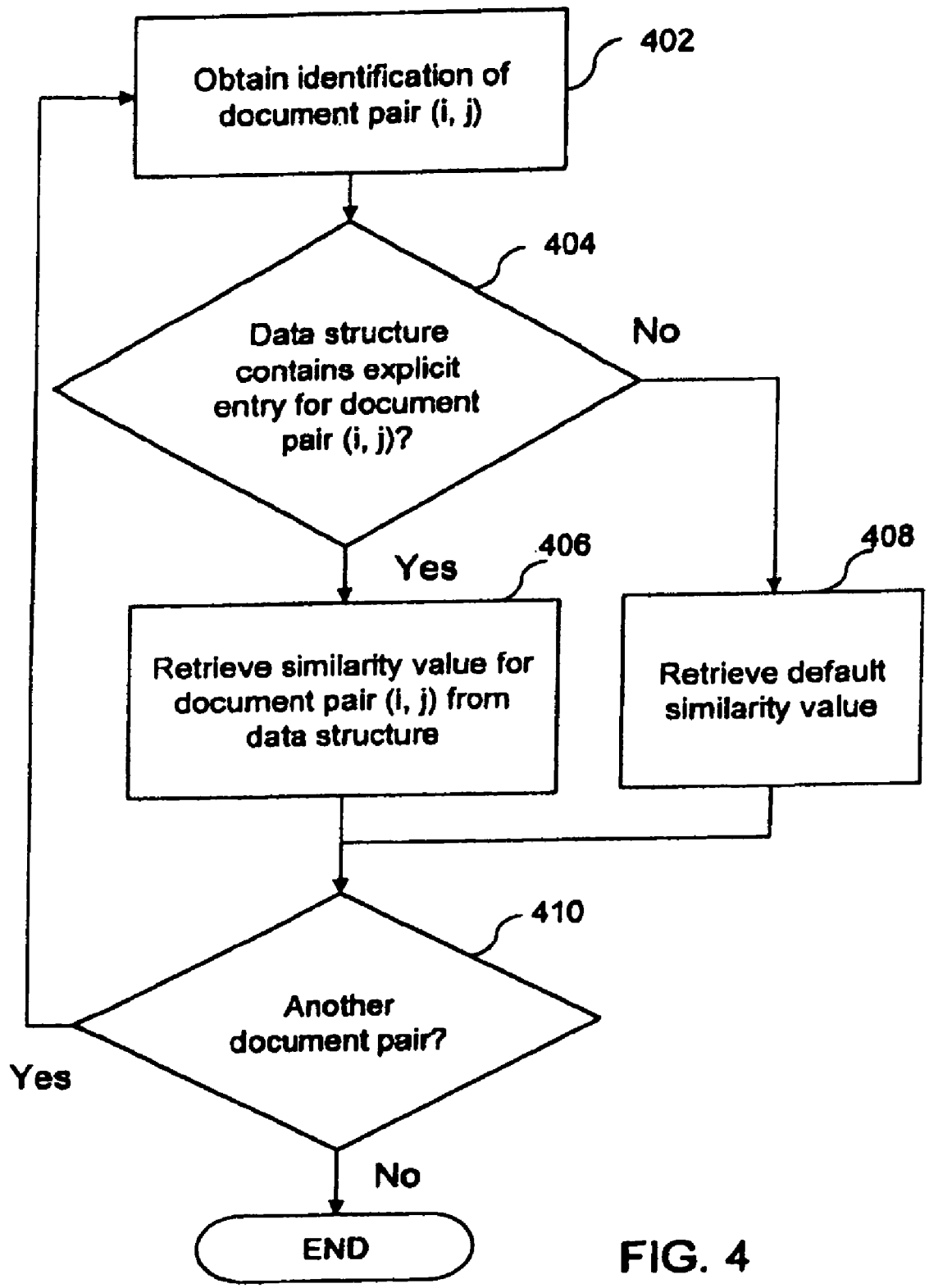
FIG. 4 is a flow diagram illustrating an exemplary method for looking up information using a compact similarity structure according to another aspect of the invention.

FIG. 4 illustrates an exemplary method 400 for looking up information using a compact similarity structure according to another aspect of the invention. At step 402, an identification of a given document pair (i, j) is obtained. For example, this identification might be generated by a training algorithm for a document-analysis model, which requires the similarity value for the given document pair (i, j). At step 404 it is determined whether the similarity structure contains an explicit entry for the similarity value for that document pair. If the similarity structure contains an explicit entry for the similarity value for that document pair, the similarity value is retrieved from the data structure at step 406. If the similarity structure does not contain an explicit entry for the similarity value for that document pair, the method proceeds from step 404 to 408, in which case the default similarity value is retrieved. The default similarity value can be retrieved from the similarity structure if it is stored there, or from another memory location. At step 410 it is determined whether the similarity value for another document pair is needed. If so, the method proceeds back to step 402 and the process repeats. If not, the method ends.

Figure 5:
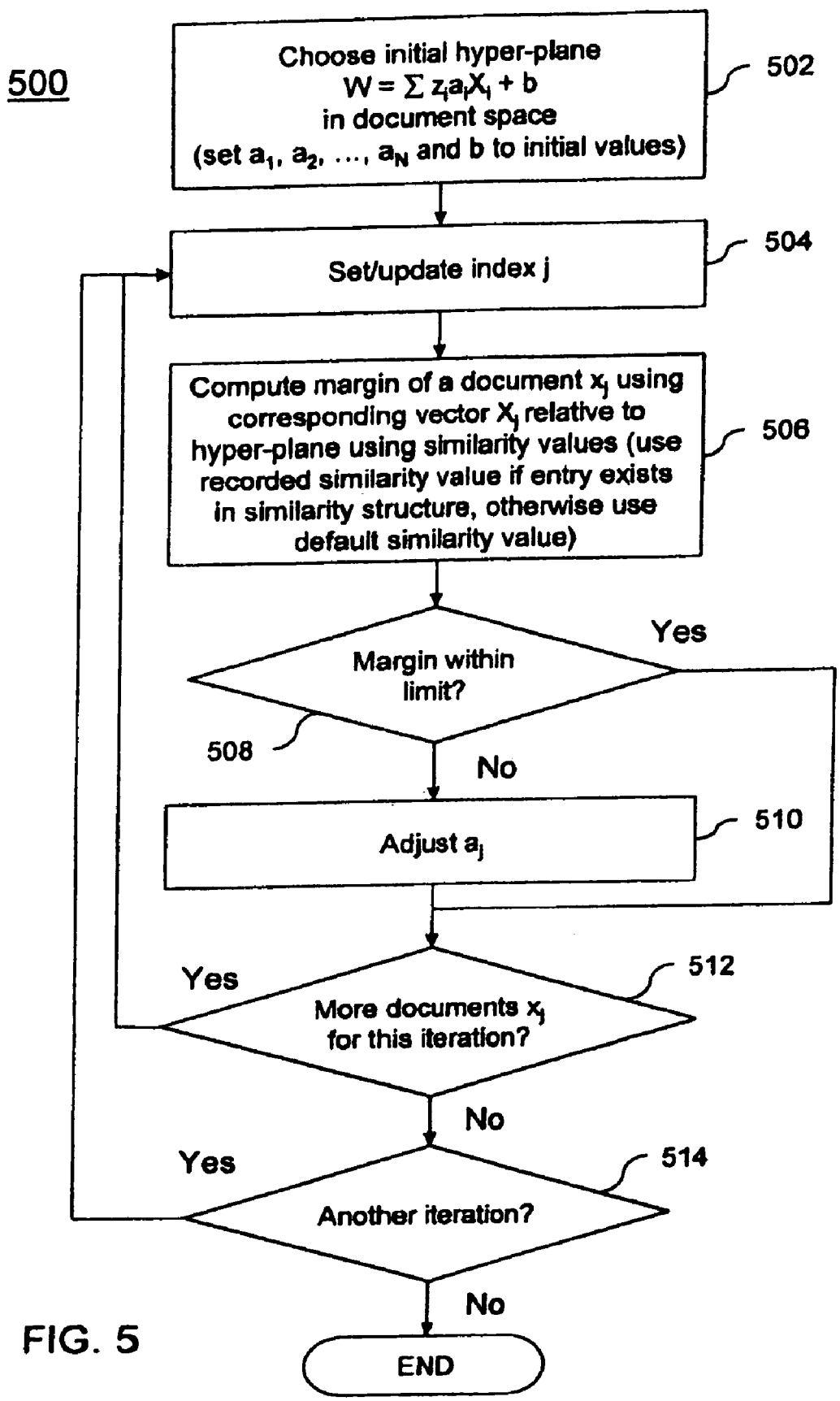
FIG. 5 is a flow diagram illustrating an exemplary method for training a document-analysis model using a compact similarity structure according to another aspect of the invention.

FIG. 5 illustrates an exemplary method for training a document-classification model (which can include, for example, the possibility of filtering documents according to relevance one document at a time) using a compact similarity structure according to another aspect of the invention. A document-classification model may also be referred to herein as a document classifier. The document-classification model is based upon generating a hyper-plane in a document feature space, wherein documents that are similar to the normal vector of the hyper-plane to within certain conditions are classified as "positive" or "relevant" documents, and wherein documents that are dissimilar to the normal vector of the hyper-plane based on certain conditions are classified as "negative" or "not relevant" documents. In order to generate the hyper-plane and its normal vector, however, the document-analysis model first needs to be trained using a set of example training documents. FIG. 5 relates to an exemplary method for such training, and the method is a self-consistent, iterative method. In the example whose discussion follows, the hyper-plane is assumed to be of the form:

$$W = \Sigma z_i \cdot a_i \cdot X_i + b,$$

where $a_i$ is a weighting coefficient for a document vector $X_i$ corresponding to a document $x_i$, and $z_i$ is a coefficient whose value is either +1 or −1, depending upon whether the document $x_i$ is a positive example or a negative example, respectively. Determining a document vector $X_i$ corresponding to a document $x_i$ is within the purview of one of ordinary skill in the art (e.g., a document vector can be, for example, all or a subset of the terms and/or features of the document, or any other suitable probe generated based upon the document). It will be appreciated that in other types of vector-support-machine (SVM) models, an equation of a hyper-plane of the type illustrated by the equation above may exist in a kernel space other than the document-feature space, and such models can perform training and document classification within the kernel space, as known to those of ordinary skill in the art. Thus, the equation above is intended to exemplary and not restrictive in any way.

As noted previously herein, a typical training set of documents may contain about 10,000 documents. In a typical training set, about 5% of the documents may be known to be relevant to a topic, issue or another document (i.e., they are "positive" examples) and 95% may be known to be not relevant (i.e., they are "negative" examples). Assembling positive and negative examples for a training set is well known to those of ordinary skill in the art (e.g., the positive and negative examples of the training set could be assembled by manual review by a group of individuals, for example) and requires no further discussion.

At step 502 an initial choice is made for the hyper-plane W by setting coefficients $a_1, a_2, \ldots, a_N$, as well as parameter b, to initial values, and by calculating the hyper-plane W based on those initial values. The parameter b can be set and fixed to zero without loss of generality, or it can be an adjustable parameter. The choices for $a_1, a_2, \ldots, a_N$, can be set to essentially any starting value based upon some initial guess. Setting these values to 1 is a convenient starting point. At step 504 an index value j is initially set to 1 to start the iteration. At step 506, a margin "m" (i.e., a measure of the difference) between a given document vector Xj and the vector normal to the hyper-plane W is computed using a formula, such as, for example:

$$m(X_j, W) = \Sigma z_i \cdot a_i \cdot K(X_j, X_i) + b,$$

where $K(X_j, X_i)$ is the similarity value for a document $x_j$ relative to a document $x_i$, and where the sum is over all i. At step 506, the similarity structure described previously herein is accessed to see if entries exist in the similarity structure for the required similarity values for given document pairs. If so, those similarity values are retrieved, such as described previously herein. For any document pairs without similarity-value entries in the similarity structure, a default similarity value is retrieved such as described previously herein. The margin m is then calculated using the retrieved similarity values.

At step 508, a determination is made as to whether the margin calculated at step 506 is within a prescribed limit. This test is done for both positive and negative training examples. For instance, for a positive training example $x_j$, the value m can be tested to see whether $p \leq m \leq q$. For a negative training example $x_j$, the value m can be tested to see whether $-q \leq m \leq -p$. In particular, for a positive training example $x_j$, if $p \leq m \leq q$, then the current value of $a_j$ can be accepted. Otherwise, if m is less than p, $a_j$ can be increased, e.g., by a predetermined step size or in proportion to an amount by which the margin m differs from p. If m is greater than q, then $a_j$ can be decreased, e.g., by a predetermined step size or in proportion to an amount by which the margin m differs from q. In one example, $a_j$ can be set to zero is m is greater than q. Similarly, for a negative training example $x_j$, if $-q \leq m \leq -p$, then the current value of $a_j$ can be accepted. Otherwise, if m is greater than $-p$ $a_j$ can be increased, e.g., by a predetermined step size or in proportion to an amount by which the margin m differs from $-p$. If m is less than $-q$, then $a_j$ can be decreased, e.g., by a predetermined step size or in proportion to an amount by which the margin m differs from $-q$. In one example, $a_j$ can be set to zero is m is less than $-q$. The value for q effectively represents the desired minimum of the absolute value of the margin m and can be set to 1, as is customarily done in connection with SVM document classifier models. The value of p effectively represents an acceptable approximation to the desired value of q and can be set to, for example, 0.99, 0.995, or 0.999, but is not limited thereto.

Determining an appropriate step size or a proportional amount for such adjustments is within the purview of one of ordinary skill in the art and will depend on, for example, balancing the desired speed of convergence of the algorithm and the need to avoid oscillatory behavior, as is conventionally known in connection with self-consistent iterative methods. Similarly, determining appropriate values for p and q will depend upon the accuracy required of the model and is within the purview of one of ordinary skill in the art.

At step 512 it is determined whether there are any more documents $x_j$ that have yet to be tested at step 508 in the present iteration. If additional documents $x_j$ remain to be tested in the present iteration, the method proceeds back to step 504, where the index j is updated and the aforementioned steps are repeated. If no further documents remain to be tested in the current iteration, the process proceeds to step 514.

At step 514 a determination is made as to whether further iterations are desired. For example, a determination can be made as to whether or not a desired number of iterations have been carried out. If not, another iteration can be carried out. Alternatively, a determination can be made as to whether the current hyper-plane has "converged" such that the difference between the present hyper-plane and that of the previous iteration is less than a predetermined amount or percentage. If so, no further iterations are necessary. As another example, a determination can be made as to whether the largest positive and negative margin errors relative to the p and q values noted above fall within predetermined limits. If not, another iteration can be carried out. A time-out condition can also be implemented at step 514 such that if a predetermined maximum number of iterations is reached, the process ends. If another iteration is desired, the method proceeds back to step 504, where the index j is reset to 1, and the process repeats as described above. If it is determined at step 514 not to conduct a further iteration, the process ends.

At this point, if a suitable hyper-plane has been determined from the above-described training algorithm, the hyper-plane can then be used in classifying new documents (not previously tested) as either relevant (positive) or not relevant (negative) relative to the hyper-plane of the document-classification model. This process can be carried out by computing the similarity values between a new document X, and the training examples with non-zero $a_i$, and adding those similarity values to obtain a margin, according to the formula:

$$m(X, W) = \Sigma z_i \cdot a_i \cdot K(X, X_i) + b$$

where the sum is over all i for which $a_i$ are non-zero. If the margin is greater than zero, the document X can be assigned to be relevant to the class of documents modeled by the hyper-plane, and if the margin is less than zero, the document can be assigned to be non-relevant.

Other algorithms for training and implementing SVM document-classification models are also known to those of ordinary skill in the art, and such algorithms can also utilize the similarity structure of the present invention. Thus, it will be appreciated that the exemplary training algorithm and the exemplary document-classification model described above are exemplary in nature and are not intended to be restrictive in any way.

An exemplary approach for setting the threshold similarity value was described above in connection with FIG. 3. Other ways of choosing the threshold similarity value can be used.

For example, the threshold value can be set based on experience, e.g., trial and error, in implementing the training algorithm and document classification model. In particular, it may be found though trial and error testing that a given threshold value or range of threshold values produces a substantial reduction in storage requirements (e.g., 60%, 70%, %80, 90% reduction), while sacrificing very little in terms of the ability of the training algorithm to produce a document classifier that suitably distinguishes positive and negative documents. Thus, by trial-and-error testing, the threshold value can be effectively "tuned" to produce an advantageous threshold. As another example, the threshold could be chosen to produce a similarity structure having a size in terms of a reduced percentage compared to a conventional similarity matrix for a document set of a given size (e.g., to achieve a similarity structure whose size is about 20% of the size of a conventional similarity matrix for a given document set). In this latter case, it will be appreciated that a training algorithm can be performed to completion based upon a subset of the training documents to produce a set of similarity values for each pair of documents of the subset. Then, those similarity values can be assessed to determine a threshold value that would exclude the desired percentage of documents of the subset. This threshold value could then be applied to generate the similarity structure for the full set of documents (e.g., the full training set), which can then be used in training the document classification model based on the entire similarity structure.

As another example, an N-fold cross-validation approach can be used to determine an advantageous choice for the threshold similarity value. In this approach, the training document set is split into N groups of approximately equal numbers of documents. One of the N groups is set aside as a test set, and the remaining N−1 groups of documents is used to train the document classification model using a given test choice for the threshold similarity value. The resulting document classifier (e.g., the resulting hyper-plane) is then used to classify documents of the remaining test set, and the classification performance (e.g., percentage of correctly classified documents or any other suitable performance measure) is recorded. This process is repeated for N−1 more instances, each of which utilizes a different one of the N groups of documents as the test set for the same test choice of the threshold similarity value. The average performance of the document classifier across all N groups is recorded, and the entire above-described process is then repeated for a new test choice of the threshold similarity value. The overall N-fold cross-validation approach therefore produces an average performance measure for each of the test choices of the threshold similarity value, and the particular test choice of the threshold similarity value that provides the best average performance can then be chosen as a final threshold similarity value for later use in generating the similarity structure described above. A threshold similarity value determined in this way can be useful since it can be used to train many other instances of document classifiers working on similar, but not the same, documents. Thus, this example provides another way in which to "tune" the threshold similarity value to obtain advantageous results.

A similarity structure as described herein, which is useful, for example, for training a document-classification model, can provide substantial advantages compared to a conventional similarity matrix. For example, because a similarity structure as described herein can be substantially smaller in size compared to a conventional similarity matrix for a given training document set, its storage requirements can be substantially reduced compared to a convention similarity matrix, and the time required to compute the similarity structure can be substantially less than the time required to compute a conventional similarity matrix. Moreover, the present inventors have found, surprisingly, that utilizing a default similarity value in place of actual similarity values for a majority of document pairs can provide such advantages without sacrificing the ability of a document classification model to provide meaningful distinctions between relevant and non-relevant documents. Similarity structures according to the present invention having sizes of 10-20% of conventional similarity matrices for a given training set size have been found to yield comparable performance in document-classification models obtained via training with compact similarity structures as described herein.

Hardware Overview

Figure 6:
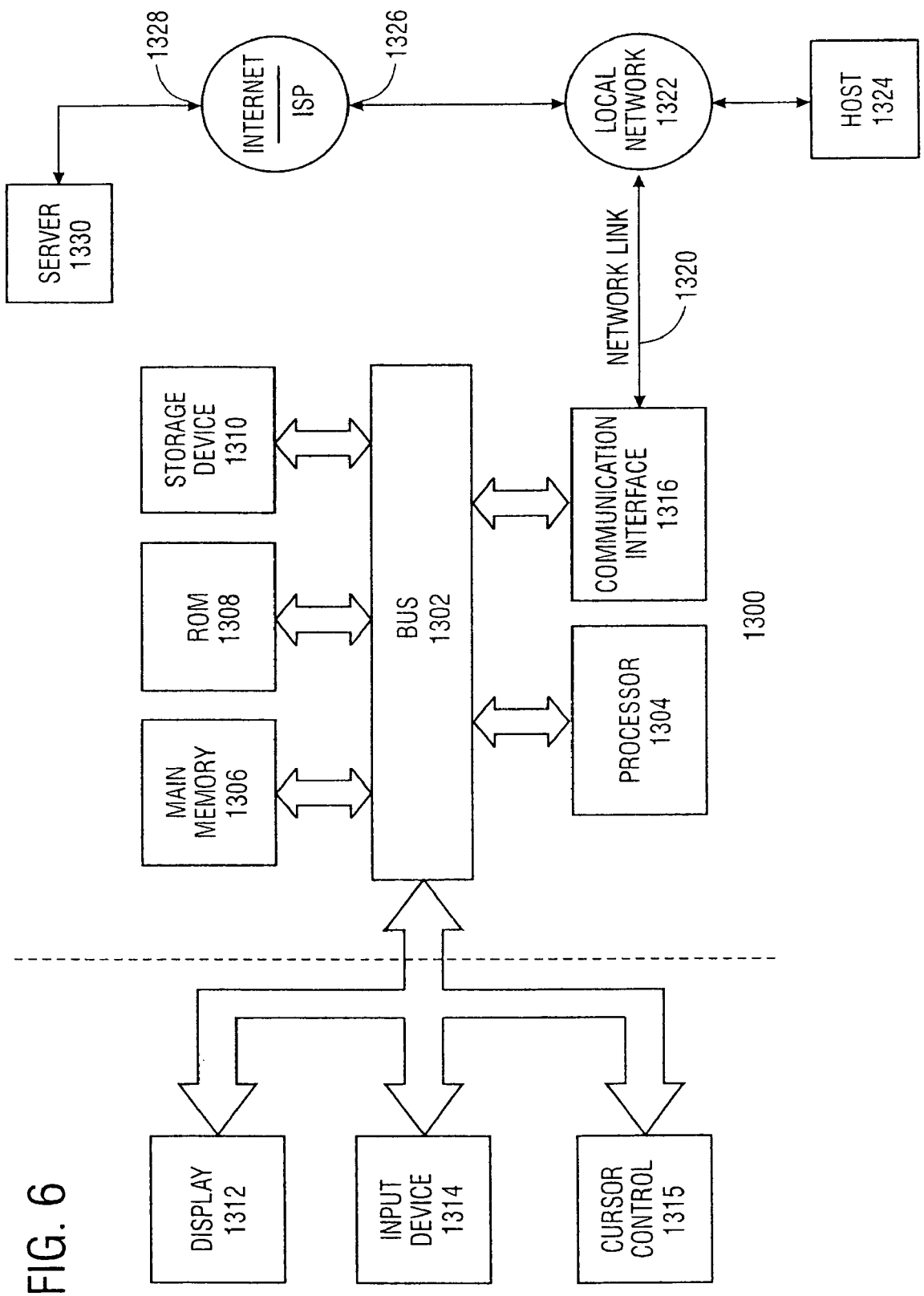
FIG. 6 illustrates an exemplary block diagram of a computer system on which exemplary approaches for constructing and/or using a compact similarity structure can be implemented according to another aspect of the invention.

FIG. 6 illustrates a block diagram of an exemplary computer system upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312 for displaying information to a computer user. An input device 1314, including alphanumeric and other keys, is coupled to bus 1302 for communicating information and command selections to processor 1304. Another type of user input device is cursor control 1315, such as a mouse, a trackball, or cursor direction keys for communicating direction information and command selections to processor 1304 and for controlling cursor movement on display 1312.

The exemplary methods described herein can be implemented with computer system 1300 for constructing and using a similarity structure such as described elsewhere herein. Such processes can be carried out by processor 1304 by executing sequences of instructions and by suitably communicating with one or more memory or storage devices such as memory 1306 and/or storage device 1310 where the set of documents and the similarity values (e.g., similarity scores) relating thereto can be stored and retrieved, e.g., in any suitable database. The processing instructions may be read into main memory 1306 from another computer-readable medium, such as storage device 1310. However, the computer-readable medium is not limited to devices such as storage device 1310. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read, containing an appropriate set of computer instructions that would cause the processor 1304 to carry out the techniques described herein. Execution of the sequences of instructions causes processor 1304 to perform process steps previously described herein. In alternative embodiments, hard-wired circuitry may be used in place of or in combination with software instructions to implement the exemplary methods described herein. Thus, embodiments of the invention are not limited to any specific combination of hardware circuitry and software.

Computer system 1300 can also include a communication interface 1316 coupled to bus 1302. Communication interface 1316 provides a two-way data communication coupling to a network link 1320 that is connected to a local network 1322 and the Internet 1328. It will be appreciated that the set of documents to be clustered can be communicated between the Internet 1328 and the computer system 1300 via the network link 1320, wherein the documents to be processed can be obtained from one source or multiples sources. Communication interface 1316 may be an integrated services digital network (ISDN) card or a modem to provide a data communication connection to a corresponding type of telephone line. As another example, communication interface 1316 may be a local area network (LAN) card to provide a data communication connection to a compatible LAN. Wireless links may also be implemented. In any such implementation, communication interface 1316 sends and receives electrical, electromagnetic or optical signals which carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the "Internet" 1328. Local network 1322 and Internet 1328 both use electrical, electromagnetic or optical signals which carry digital data streams. The signals through the various networks and the signals on network link 1320 and through communication interface 1316, which carry the digital data to and from computer system 1300, are exemplary forms of modulated waves transporting the information.

Computer system 1300 can send messages and receive data, including program code, through the network(s), network link 1320 and communication interface 1316. In the Internet 1328 for example, a server 1330 might transmit a requested code for an application program through Internet 1328, ISP 1326, local network 1322 and communication interface 1316. In accordance with the invention, one such downloadable application can provides for carrying out document processing as described herein. Program code received over a network may be executed by processor 1304 as it is received, and/or stored in storage device 1310, or other non-volatile storage for later execution. In this manner, computer system 1300 may obtain application code in the form of a modulated wave, which is intended to be embraced within the scope of a computer-readable carrier.

Components of the invention may be stored in memory or on disks in a plurality of locations in whole or in part and may be accessed synchronously or asynchronously by an application and, if in constituent form, reconstituted in memory to provide the information used for retrieval, scoring, and/or classifying documents.

While this invention has been particularly described and illustrated with reference to particular embodiments thereof, it will be understood by those skilled in the art that changes in the above description or illustrations may be made with respect to form or detail without departing from the spirit or scope of the invention.

What is claimed is:

1. A method for retrieving similarity values from a data structure for a set of documents, comprising:

accessing the data structure to determine whether the data structure contains an explicit entry for a similarity value for a given pair of documents;

if the data structure contains an explicit entry of the similarity value for the given pair of documents, retrieving the similarity value; and if the data structure does not contain an explicit entry of the similarity value for the given pair of documents, retrieving a default similarity value from the data structure or from another memory location, wherein the data structure comprises a plurality of entries of the similarity values, and wherein the plurality of entries of the similarity values are fewer than $N^2-N$ in number if the similarity values are asymmetric with regard to document pairing and wherein the plurality of entries of the similarity values are fewer than $$\frac{N^2-N}{2}$$

in number if the similarity values are symmetric with regard to document pairing, where N equals the number of documents.

2. The method of claim 1, wherein the default similarity value is equal to the threshold similarity value.

3. The method of claim 1, wherein the default similarity value is less than the threshold similarity value.

4. A computer readable medium storing processing instructions adapted to cause a processing unit to execute a method, comprising:

accessing the data structure to determine whether the data structure contains an explicit entry for a similarity value for a given pair of documents;

if the data structure contains an explicit entry of the similarity value for the given pair of documents, retrieving the similarity value; and if the data structure does not contain an explicit entry of the similarity value for the given pair of documents, retrieving a default similarity value from the data structure or from another memory location, wherein the data structure comprises a plurality of entries of the similarity values, and wherein the plurality of entries of the similarity values are fewer than $N^2-N$ in number if the similarity values are asymmetric with regard to document pairing and wherein the plurality of entries of the similarity values are fewer than $$\frac{N^2-N}{2}$$

in number if the similarity values are symmetric with regard to document pairing, where N equals the number of documents.

5. An apparatus for retrieving similarity values from a data structure for a set of documents, comprising:

a memory; and a processing unit coupled to the memory, wherein the processing unit is configured to execute the steps of:

accessing the data structure to determine whether the data structure contains an explicit entry for a similarity value for a given pair of documents;

if the data structure contains an explicit entry of the similarity value for the given pair of documents, retrieving the similarity value; and if the data structure does not contain an explicit entry of the similarity value for the given pair of documents, retrieving a default similarity value from the data structure or from another memory location, wherein the data structure comprises a plurality of entries of the similarity values, and wherein the plurality of entries of the similarity values are fewer than $N^2-N$ in number if the similarity values are asymmetric with regard to document pairing and wherein the plurality of entries of the similarity values are fewer than $$\frac{N^2-N}{2}$$

in number if the similarity values are symmetric with regard to document pairing, and N equals the number of documents.

6. A computer-readable medium having stored thereon a data structure for providing information about levels of similarity between pairs of documents of a set of documents, the documents being N in number, the data structure comprising:

a plurality of entries of similarity values representing levels of similarity for a plurality of pairs of said documents, each of said similarity values representing a level of similarity of one document of a given pair relative to the other document of the given pair, wherein the similarity value of each entry is greater than a threshold similarity value that is greater than zero, and wherein the plurality of entries of similarity values are fewer than $N^2-N$ in number if the similarity values are asymmetric with regard to document pairing and wherein the plurality of entries of similarity values are fewer than $$\frac{N^2-N}{2}$$

in number if the similarity values are symmetric with regard to document pairing, where N equals the number of documents.

7. The computer readable medium of claim 6, further comprising:

an entry comprising the threshold similarity value; and
an entry comprising a default similarity value.

8. The computer readable medium of claim 6, wherein the default similarity value is equal to the threshold similarity value.

9. The computer readable medium of claim 6, wherein the default similarity value is less than the threshold similarity value.

* * * * *